United States Patent
Heda et al.

(10) Patent No.: US 8,720,275 B2
(45) Date of Patent: May 13, 2014

(54) DETECTING ROTOR ANOMALIES

(75) Inventors: Sanjeev Shyam Heda, Kennesaw, GA (US); Robert Joseph Iasillo, Atlanta, GA (US); Eric Thomas Pool, Roswell, GA (US); Nirmal Sahadevan, Atlanta, GA (US); Scott Alan Wood, Suwanee, GA (US)

(73) Assignee: General Electric Company, Schenectady, NY (US)

( * ) Notice: Subject to any disclaimer, the term of this patent is extended or adjusted under 35 U.S.C. 154(b) by 319 days.

(21) Appl. No.: 13/343,149

(22) Filed: Jan. 4, 2012

(65) Prior Publication Data
US 2013/0167649 A1    Jul. 4, 2013

(51) Int. Cl.
*G01M 13/00*    (2006.01)

(52) U.S. Cl.
USPC .................................. 73/660; 73/593; 73/649

(58) Field of Classification Search
USPC .......................... 73/660, 593, 649; 702/56, 33
See application file for complete search history.

(56) References Cited

U.S. PATENT DOCUMENTS

| | | | |
|---|---|---|---|
| 4,380,172 A | 4/1983 | Imam et al. | |
| 6,542,856 B2 | 4/2003 | Frantz et al. | |
| 6,711,952 B2 | 3/2004 | Leamy et al. | |
| 6,868,325 B2 | 3/2005 | Menon et al. | |
| 7,283,914 B2 * | 10/2007 | Poorman et al. | 702/56 |
| 7,366,590 B2 * | 4/2008 | Balasu | 701/3 |
| 7,409,319 B2 | 8/2008 | Kant et al. | |
| 7,724,462 B2 * | 5/2010 | Duan et al. | 360/75 |
| 7,866,213 B2 | 1/2011 | Twerdochlib | |
| 8,352,216 B2 * | 1/2013 | Subbu et al. | 702/181 |
| 2009/0037121 A1 | 2/2009 | Muralidharan et al. | |

OTHER PUBLICATIONS

GE Power & Water: Aeroderivative Gas Turbines Fact Sheet, "Aeroderivative Remote Operations Center (AEROC)," Feb. 2011, 1 page.
Sudmersen et al., "Transient Vibration Signatures at Steam and Gas Turbines," Jun. 2003, 10 pages, PANNDT 2003, Rio Brasil.

\* cited by examiner

*Primary Examiner* — J M Saint Surin
(74) *Attorney, Agent, or Firm* — Ernest G. Cusick; Hoffman Warnick LLC

(57) ABSTRACT

An approach for detecting rotor anomalies is disclosed. An on-site monitoring unit monitors vibration measurements obtained from a rotor during a transient speed operation. In one aspect, the on-site monitoring unit classifies the vibration measurements into predetermined ranges of rotor speed during the transient speed operation, determines maximum vibration data for each of the predetermined ranges of rotor speed during the transient speed operation and compiles the maximum vibration data into a snapshot of the vibration measurements obtained during the transient speed operation. A remote monitoring unit detects a rotor anomaly from the snapshot of vibration measurements generated by the on-site monitoring unit.

20 Claims, 2 Drawing Sheets

DETECTING ROTOR ANOMALIES

BACKGROUND OF THE INVENTION

The present invention relates generally to rotor monitoring and more particularly to using extracted vibration features to monitor a rotor for anomalies.

Vibration monitoring is often used to monitor a rotor of a turbine for anomalies. Typically, vibration monitoring of a turbine rotor for anomaly detection involves a specialist reviewing vibration measurements obtained from a turbine during full-speed operations. The specialist typically reviews the vibration measurements for changes in vibration to determine the presence of an anomaly. In order to delve further into the severity of the anomaly, the specialist has to manually pull-up and analyze all of the information and data obtained during the full-speed operation of the turbine. This is a very time-consuming process to analyze an anomaly condition that does not result in a real-time solution. Sometimes this process can be made even more time-consuming if the specialist believes that it would be necessary to examine frequency data associated with the vibration measurements obtained from the turbine. Typically, turbine units are not deployed with equipment to perform real-time monitoring on the frequency associated with vibration measurements, and thus would have to be retrofitted with equipment that can record a full frequency spectrum of vibration measurements. After retrofitting the turbine with the proper equipment, frequency data associated with vibration measurements can then be recorded and sent to the specialist for review. The specialist can then analyze this new data along with the vibration measurements that initially precipitated the detection of an anomaly. Again, any solution derived from this process would not be a real-time solution. Another shortcoming with these vibration monitoring processes is that only vibration measurements obtained from a turbine operating at full-speed operations are used. Some failure events that result in anomalies cannot be detected using data obtained from a turbine at full-speed operations.

BRIEF DESCRIPTION OF THE INVENTION

In one aspect of the present invention, a system is provided. The system comprises at least one vibration sensor that obtains vibration measurements from a rotor during a transient speed operation. An on-site monitoring unit, local to the at least one vibration sensor and the rotor, monitors the vibration measurements during the transient speed operation. The on-site monitoring unit classifies the vibration measurements into one of a plurality of predetermined ranges of rotor speed during the transient speed operation, determines maximum vibration data for each of the plurality of predetermined ranges of rotor speed during the transient speed operation and compiles the maximum vibration data into a snapshot of the vibration measurements obtained during the transient speed operation after the rotor completes the transient speed operation. A remote monitoring unit, remote from the at least one vibration sensor, the rotor and the on-site monitoring unit, detects a rotor anomaly from the snapshot of vibration measurements generated by the on-site monitoring unit.

In a second aspect of the present invention, a system for detecting rotor anomalies in real-time is disclosed. The system comprises a rotor. One or more operational sensors located about the rotor measure operational data during a transient speed operation of the rotor. The operational data includes rotor speed. At least one vibration sensor obtains vibration measurements from the rotor during the transient speed operation. A monitoring unit detects a rotor anomaly based on the vibration measurements and the operational data obtained during the transient speed operation. The monitoring unit classifies the vibration measurements into one of a plurality of predetermined ranges of rotor speed during the transient speed operation, determines maximum vibration data for each of the plurality of predetermined ranges of rotor speed during the transient speed operation, compiles the maximum vibration data into a snapshot of the vibration measurements obtained during the transient speed operation after the rotor completes the transient speed operation, and analyzes the snapshot of the vibration measurements to determine if the vibration measurements obtained during the transient speed operation is indicative of a potential rotor anomaly.

In a third aspect of the present invention, a computer-readable storage device storing computer instructions is disclosed, which when executed, enables a computer system to perform a method for detecting rotor anomalies. In this embodiment, the method comprises: receiving vibration data obtained from a rotor during a transient speed operation; classifying the vibration data into one of a plurality of predetermined ranges of rotor speed during the transient speed operation; determining maximum vibration data for each of the plurality of predetermined ranges of rotor speed during the transient speed operation; in response to the rotor completing the transient speed operation, compiling the maximum vibration data into a snapshot of the vibration data obtained during the transient speed operation; analyzing the snapshot of the vibration data to determine if the vibration measurements obtained during the transient speed operation is indicative of a rotor anomaly, the analyzing comprises performing one of ascertaining whether the snapshot of the vibration data is indicative of a potential detection of a rotor anomaly and comparing the snapshot of the vibration data obtained during the transient speed operation to historical vibration measurement snapshots obtained from a predetermined number of previous transient speed operations performed by the rotor in response to determining the potential detection of a rotor anomaly, and comparing the snapshot of the vibration data obtained during the transient speed operation to historical vibration measurement snapshots obtained from a predetermined number of previous transient speed operations performed by the rotor and determining whether the snapshot of the vibration measurements is exhibiting non-repeatable behavior in comparison to the historical vibration measurement snapshots obtained from the predetermined number of previous transient speed operations.

DETAILED DESCRIPTION OF THE INVENTION

Figure 1:
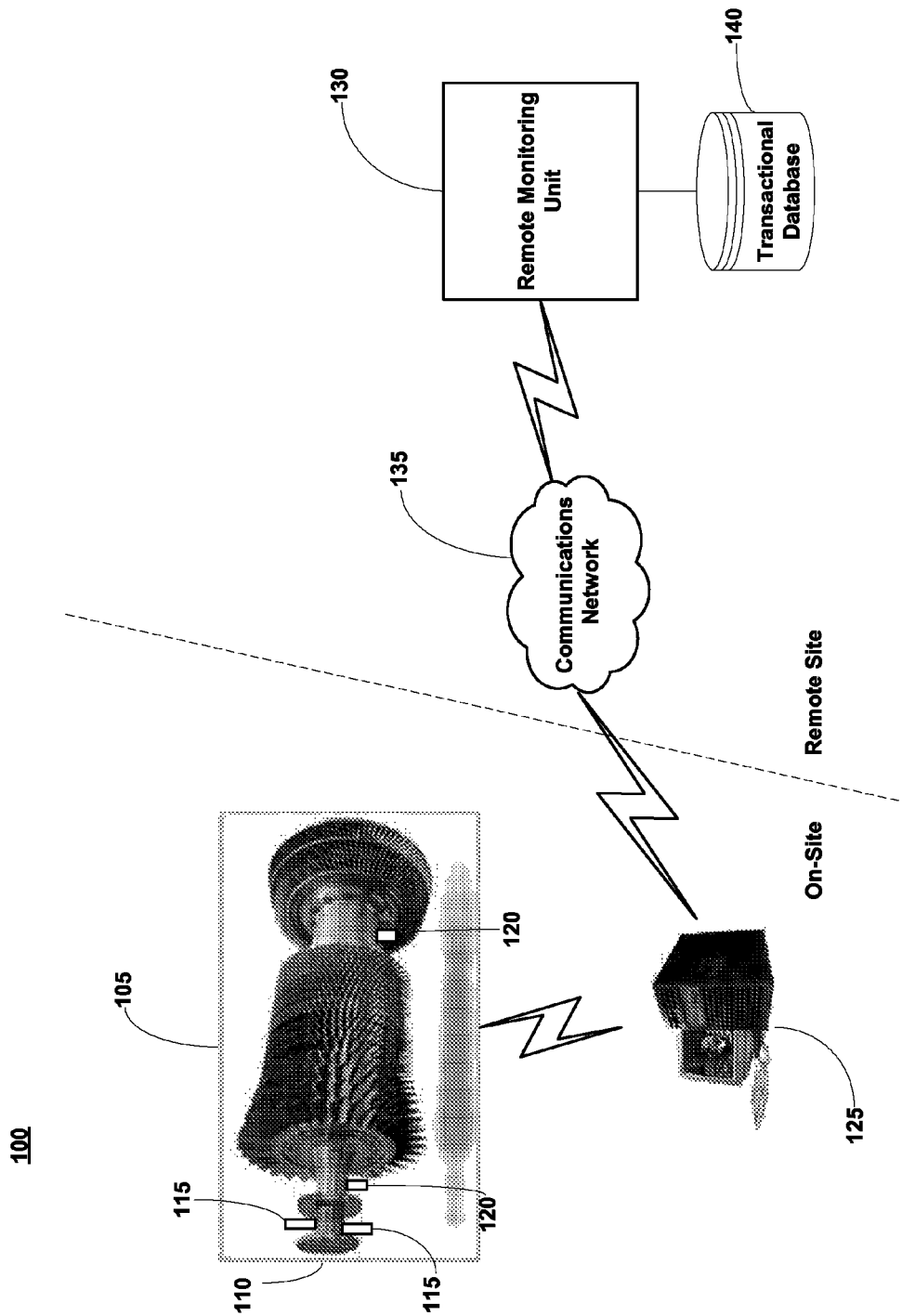
FIG. 1 is a schematic illustration of a turbine rotor monitoring system according to one embodiment of the present invention.

Various embodiments of the present invention are directed to performing real-time monitoring of a turbine for rotor anomalies using vibration measurements obtained during a transient speed operation. In one embodiment, an on-site monitoring unit receives vibration measurements from at least one vibration sensor located about the turbine rotor. The on-site monitoring unit may also receive operational data (e.g., speed, temperature, pressure) obtained from various operational sensors located about the turbine. The on-site monitoring unit, which can be a monitoring device deployed to specifically monitor operation of the turbine or part of a controller used to monitor the turbine, executes an algorithm that continually analyzes the operation of the turbine, as well as any other turbines located at that site in real-time. In particular, the on-site monitoring unit classifies the vibration measurements into one of a plurality of predetermined ranges of turbine rotor speed, determines maximum vibration data for each of the plurality of predetermined ranges of turbine rotor speed and at the completion of the transient speed operation, compiles the maximum vibration data into a snapshot of the vibration measurements obtained during the operation along with the operational data obtained during the transient speed operation. The on-site monitoring unit then transmits the snapshot to a remote monitoring unit for analysis to determine the presence of a potential anomaly. The on-site monitoring unit may transmit the snapshot of vibration data in a format that includes time-series data and trigger event-based data.

The remote monitoring unit executes a separate algorithm that continually analyzes the snapshot of vibration data in the time-series format to determine the presence of a potential anomaly. This may include determining whether the vibration data as embodied in the snapshot is exhibiting non-repeatable behavior or has exceeded a predetermined threshold. As used herein, vibration data that is exhibiting non-repeatable behavior is outside the normal range based on previous data points. An escalated or heighten review of the snapshot is initiated if the remote monitoring unit determines that the vibration data in the snapshot is starting to exhibit non-repeatable behavior or has exceeded the predetermined threshold. In particular, the remote monitoring unit performs a confirmatory turbine rotor anomaly analytic that involves using the snapshot of the vibration data as embodied in the trigger event-based data format and comparing it to historical vibration measurement snapshots obtained from a predetermined number of previous transient speed operations performed by the turbine rotor that are stored in a transactional database in the remote monitoring unit. The confirmatory turbine rotor anomaly analytic determines the detection of a turbine rotor anomaly if the snapshot of the vibration measurements obtained from the on-site monitoring unit is exhibiting non-repeatable behavior in comparison to the historical vibration measurement snapshots obtained from the predetermined number of previous transient speed operations. The remote monitoring unit can then recommend a corrective action in response to determining the detection of a turbine rotor anomaly.

In another embodiment, the remote monitoring unit may determine the presence of a rotor anomaly based solely on the snapshot of data as embodied in the trigger event-based data format. Instead of examining the snapshot in the time-series data format, this embodiment would determine the presence of a turbine rotor anomaly if the snapshot of the vibration measurements obtained from the on-site monitoring unit is exhibiting non-repeatable behavior in comparison to the historical vibration measurement snapshots obtained from the predetermined number of previous transient speed operations stored in the transactional database.

In another embodiment, the remote monitoring unit may determine the presence of a rotor anomaly based solely on the snapshot of data as embodied in the time-series data format. In this embodiment, the remote monitoring unit could determine the presence of a turbine rotor anomaly if the vibration data as embodied in the time-series snapshot is exhibiting non-repeatable behavior or has exceeded a predetermined threshold.

In another embodiment, the aforementioned operations performed at the on-site monitoring unit and the remote monitoring unit may be combined to be performed at one site, either at the on-site monitoring unit or the remote monitoring unit.

Technical effects of the various embodiments of the present invention include providing an effective solution for attaining real-time monitoring of a turbine rotor that determines potential detection of anomalies, escalates the review to a heighted state to ascertain whether or not actual rotor anomalies exists, so that quick dispositions or corrective actions can be made. This increases the probability of detecting rotor anomalies before they become significant. Other technical effects include providing an effective solution for detecting rotor anomalies from only using transient speed operations. Additional technical effects associated with the various embodiments of the present invention include obviating the need to retrofit turbines with equipment to record the frequencies of the vibration measurements in order to assist in the determination of detecting anomalies. Other technical effects include providing increased remote monitoring and diagnostic capability for service providers and turbine manufacturers that monitor fleets of turbines operating at various locations.

Referring to the drawings, FIG. 1 is a schematic illustration of a turbine rotor monitoring system 100 according to one embodiment of the present invention. The various embodiments described herein are applicable for use with gas turbines and steam turbines. However, it should be apparent to those skilled in the art and guided by the teachings herein that the present invention is likewise applicable to any industrial machinery driven by rotor where it may be desirable to monitor vibration measurements to detect anomalies that arise in operation of the machinery. For example, axial compressors are one area in which the various embodiments of the present invention have utility.

As shown in FIG. 1, turbine rotor monitoring system 100 includes a turbine 105 having a rotor 110. At least one vibration sensor 115 is located about rotor 110 to measure vibrations during operation. For clarity, only two vibration sensors 115 are illustrated, however those skilled in the art will recognize that more or less sensors can be used. In one embodiment, vibration sensors 115 may include contacting and non-contacting sensors (e.g., accelerometers and proximity sensors). In one embodiment, vibration sensors 115 can be located in the bearing caps that contain bearings that facilitate rotation of rotor 110 during operation of turbine 105.

In the various embodiments of the present invention, the vibration measurements obtained from rotor 110 may occur during transient speed operations. As used herein, a transient speed operation may include start-up operations, shut-down operations and maintenance operations that occur at speeds that are reached in start-ups and shut-downs of turbine 105.

Turbine 105 as shown in FIG. 1 further includes one or more operational sensors 120 located about the turbine rotor to measure operational data associated with the turbine. For clarity, only two operational sensors 120 are illustrated, however those skilled in the art will recognize that a typical turbine could have many more sensors located thereabout to measure various operating parameters. Those skilled in the art will recognize that the location of sensors 120 can vary and are not limited to any one particular location. In one embodiment, operational sensors 120 may include speed sensors that measure the speed of rotor 110 during operation. Other sensors could include temperature sensors, pressure sensors, current sensors, etc.

For clarity in explaining the various embodiments of the present invention only a few components associated with turbine 105 are illustrated and described herein. Those skilled in the art will appreciate that turbine 105 would have various other components that are not discussed herein.

As shown in FIG. 1, turbine rotor monitoring system 100 further includes on-site monitoring unit 125 that monitors the vibration measurements obtained from vibration sensors 115 during the transient speed operation of turbine 105. In one embodiment, on-site monitoring unit 125 executes an algorithm that facilitates continued monitoring and processing of the vibration measurements sent by vibration sensors 115. The algorithm enables on-site monitoring unit 125 to perform operations that include classifying the vibration measurements into one of a plurality of predetermined ranges of turbine rotor speed during the transient speed operation, determining maximum vibration data for each of the plurality of predetermined ranges of turbine rotor speed during the transient speed operation, and at the completion of the transient speed operation, compiling the maximum vibration data into a snapshot of the vibration measurements obtained during the operation.

The operation of classifying the vibration measurements into one of a plurality of predetermined ranges of turbine rotor speed includes using operational sensors 120 to ascertain the speed of rotor 110 for each vibration measurement obtained from vibration sensors 115 during the transient speed operation and placing the vibration measurements in one of the rotor speed ranges of classification. The predetermined ranges of turbine rotor speed can represent rotor speeds that are sufficient to cause rotor 110 to exhibit distinct vibrational behavior due to the natural frequencies of the rotor itself. In one embodiment, a plurality of predetermined ranges of turbine rotor speed may include 25% to 40% speed, 40% to 65% speed, 65% to 95% speed, and above 95% (i.e., the first point above full speed with no load). Those skilled in the art will recognize that these ranges of turbine rotor speed classification are only examples, and that many other possible ranges can be used. Thus, the aforementioned ranges are not meant to limit the scope of the various embodiments of the present invention described herein.

The operation of determining the maximum vibration data for each of the ranges of turbine rotor speed generally includes comparing incoming vibration data obtained from vibration sensors 115 at a certain rotor speed to a maximum value that is currently stored in memory of on-site monitoring unit 125 as turbine 105 cycles through the transient speed operation. If an incoming vibration measurement exceeds a maximum value stored in memory, then it replaces that value for that particular rotor speed range of classification. On the other hand, if the incoming vibration measurement does not exceed the maximum value stored in memory, then the existing value remains in memory. This processing of the vibration measurement is performed continually during the transient speed operation as rotor 110 moves through the various ranges of rotor speed.

Once the transient speed operation is complete, on-site monitoring unit 125 can then compile the maximum vibration data for each of the predetermined ranges of turbine speed into the snapshot. The snapshot is generally a representation of vibration features or a vibration signature of the vibration that is exhibited by rotor 110 as turbine 105 performs the transient speed operation. The snapshot may also include the operational data obtained during the transient speed operation by operation sensors 120. In one embodiment, the compiling of the maximum vibration data into the snapshot can include gathering the maximum vibration data and the relevant speed at which it occurs and the operational data obtained during the transient speed operation, and placing this data in a form that comprises one of time-series data and trigger event based data. Time-series data of the vibrational snapshot could include the time that the transient speed operation occurred. For example, time-series data of the snapshot could include the day of performing the transient speed operation and how many times the operation was performed in that day. Trigger event-based data of the vibrational snapshot would not include the time frame in which it was obtained; only that the transient speed operation occurred. In either case, a time stamp may be used to indicate when the transient speed operation was triggered. Essentially, the difference between time-series data and trigger event based data is a matter of how the data can be stored and queried. By having the vibrational snapshot in this form, an analysis of the data can be made, as discussed below, with snapshots obtained from previously run transient speed operations. With the vibrational snapshot in a time-series format and a trigger event-based format, on-site monitoring unit 125 can then send this information to a remote site for further processing and analysis.

As shown in FIG. 1, a remote monitoring unit 130 is in communication with on-site monitoring unit 125 via a communications network 135 (e.g., wired connection or a wireless connection). In one embodiment, remote monitoring unit 130 receives the snapshot of the vibration measurements from on-site monitoring unit 125 via communications network 135 after completion of the transient speed operation, for determination of the presence of anomalies. In one embodiment, remote monitoring unit 130 receives the snapshot in both a time-series format and a trigger event-based format. Remote monitoring unit 130 can store the snapshot in the trigger-based event format in a transactional database 140 containing historical snapshots of transient speed operations obtained from turbine 105 as well as any other turbine located at the site of turbine 105 and historical snapshots of similar turbines operating at other locations. Those skilled in the art will recognize that remote monitoring unit 130 can have other databases that store additional information (e.g., rules for fixing anomalies, corrective actions, turbine data, etc.), or it is possible to store this information and the information in transactional database 140 all in one database. In this embodiment, while the snapshot in the trigger-based event format is placed in transactional database 140, an algorithm is executed that analyzes the snapshot of vibration data in the time-series format to determine if the vibration measurements obtained during the transient speed operation contain any potential anomalies.

The algorithm executed by remote monitoring unit 130 to determine the presence of any potential anomalies may include determining whether the vibration data as embodied in the snapshot is exhibiting non-repeatable behavior or has exceeded a predetermined threshold. As mentioned above, vibration data that is exhibiting non-repeatable behavior is characterized by outside the normal range based on previous data points. Remote monitoring unit 130 can initiate an escalated or heighten review of the snapshot if the vibration data is exhibiting non-repeatable behavior or has exceeded a predetermined threshold. In one embodiment, the algorithm could generate an escalation alarm that indicates the potential detection of a turbine rotor anomaly in response to determining that the vibration measurements in the snapshot is exhibiting non-repeatable behavior or has exceeded the predetermined threshold. The algorithm executed by remote monitoring unit 130 can then perform a confirmatory turbine rotor anomaly analytic to determine the actual presence of an anomaly.

In one embodiment, the confirmatory turbine rotor anomaly analytic can entail using the snapshot of the vibration data as embodied in the trigger event-based data format that is stored in transactional database 140 and comparing it to historical vibration measurement snapshots obtained from a predetermined number of previous transient speed operations performed by turbine rotor 105 (e.g., using the snapshots generated from the 10 previous transient speed operations). The confirmatory turbine rotor anomaly analytic can determine the detection of a turbine rotor anomaly if the snapshot of the vibration measurements obtained from on-site monitoring unit 125 is exhibiting non-repeatable behavior in comparison to the historical vibration measurement snapshots obtained from the selected predetermined number of previous transient speed operations. If the confirmatory turbine rotor anomaly analytic determines the actual presence of an anomaly, remote monitoring unit 130 can then generate a recommended corrective action to take to remedy a cause for the anomaly. For example, remote monitoring unit 130 could recommend a boroscope inspection of the turbine after next shutdown. Note that this is just one example of a corrective action that could be taken and those skilled in the art will appreciate that there can be many other options, all of which will depend on the severity of the cause for the anomaly. If the confirmatory turbine rotor anomaly analytic does not detect the presence of an anomaly, then remote monitoring unit 130 would not recommend taking any corrective actions.

In an alternative embodiment, remote monitoring unit 130 may determine the presence of an anomaly using only the snapshot of the vibration measurements embodied in the trigger event-based data format as opposed to using both the snapshots in a time-series and a trigger event-based data. In this embodiment, the algorithm in remote monitoring unit 130 could invoke the aforementioned confirmatory turbine rotor anomaly analytic to compare the snapshot of the vibration measurements received from on-site monitoring unit 125 to a predetermined number of historical vibration measurement snapshots stored in the transactional database that were obtained from a specified number of previous transient speed operations performed by turbine 105. Remote monitoring unit 130 can determine the actual presence of an anomaly if the snapshot received from on-site monitoring unit 125 is exhibiting non-repeatable behavior in comparison to the predetermined number of historical vibration measurement snapshots retrieved from the transactional database. If the confirmatory turbine rotor anomaly analytic determines the actual presence of an anomaly, remote monitoring unit 130 can then generate a recommended corrective action to take to remedy the anomaly. On the other hand, if the confirmatory turbine rotor anomaly analytic does not detect the presence of an anomaly, then remote monitoring unit 130 would not recommend taking any corrective actions.

In yet another alternative embodiment, remote monitoring unit 130 may determine the presence of an anomaly using only the snapshot of the vibration measurements embodied in the time-series format as opposed to using the snapshots in time-series and/or the trigger event-based data. In this embodiment, the algorithm in remote monitoring unit 130 can determine the presence of an anomaly by comparing the snapshot to historical data to determine if the vibration data is exhibiting non-repeatable behavior or alternatively, if the vibration data has exceeded a predetermined threshold. In this embodiment, if an anomaly is detected, remote monitoring unit 130 can then generate a recommended corrective action to take to remedy the anomaly. On the other hand, if an anomaly is not detected, then remote monitoring unit 130 would not recommend taking any corrective actions.

In one embodiment, on-site monitoring unit 125 can be a data acquisition system that collects sensor data from vibration sensors 115 and operational sensors 120, and that is programmed to perform the aforementioned processing operations on the collected data. One example of such a data acquisition system that can be used as on-site monitoring unit 125 is a commercially available monitoring unit such as the GE ON-SITE MONITOR provided by the General Electric Company. Those skilled in the art will recognize that on-site monitoring unit 125 may be deployed as part of a turbine controller. For example, the algorithms performed by on-site monitoring unit 125 may be embodied in a commercially available turbine controller such as the MARK VI SPEEDTRONIC CONTROLLER™ provided by the General Electric Company.

In one embodiment, remote monitoring unit 130 can be a central host computing unit that is online with on-site monitoring unit 125. Remote monitoring unit 130 can employ software algorithms, a plurality of rules and databases that allow an operator to perform remote monitoring and diagnostics of turbine 105, as well as other turbines located at that particular site and other remote sites.

Figure 2:
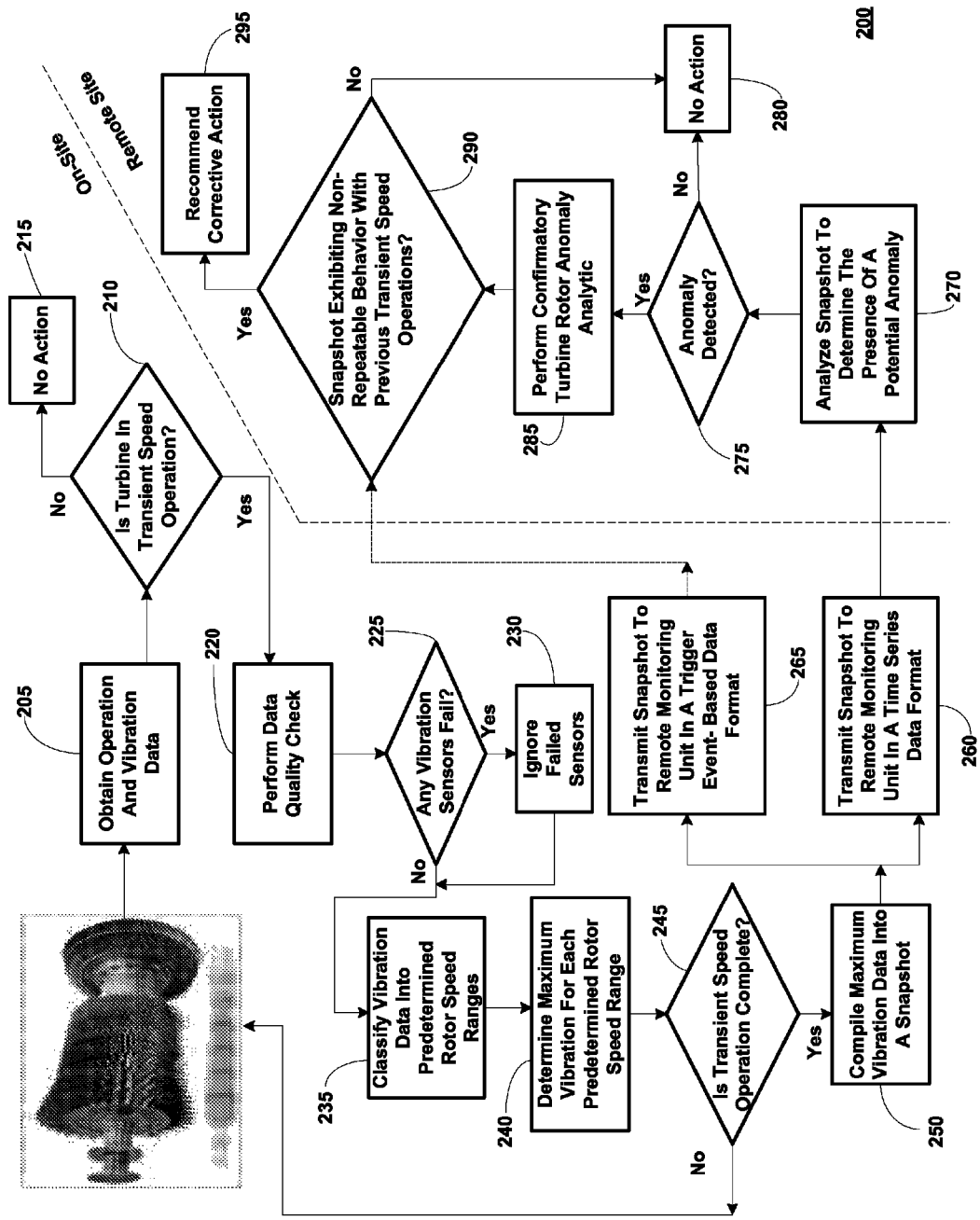
FIG. 2 is a flow diagram describing the process operations associated with using the turbine rotor monitoring system of FIG. 1 to detect the presence of rotor anomalies according to one embodiment of the present invention.

FIG. 2 is a flow diagram 200 describing the process operations associated with using the turbine rotor monitoring system 100 of FIG. 1 to detect the presence of rotor anomalies according to one embodiment of the present invention. The process operations of detecting the presence of turbine rotor anomalies begin at 205 by obtaining vibration measurements and operational measurements (e.g., pressure, rotor speed, temperature, etc.) from vibration sensors 115 and operational sensors 120, respectively, from turbine 105 and transmitting them to on-site monitoring unit 125.

On-site monitoring unit 125 determines at 210 whether the measurements received from the sensors were collected while turbine 105 is undergoing a transient speed operation. If on-site monitoring unit 125 determines that turbine 105 is not undergoing a transient speed operation, then no further action is taken at 215. Note that although various embodiments of the present invention are directed to detecting anomalies at transient speed operation, those skilled in the art will recognize that on-site monitoring unit 125 could have algorithms that are executed during full-speed steady-state operations to determine rotor anomalies that arise in this mode. In this embodiment, on-site monitoring unit 125 would process the vibration measurement and operational measurements and transmit them to remote monitoring unit 130 which could detect the presence of rotor anomalies. In one embodiment, remote monitoring unit 130 can analyze vibration measurements obtained during both transient speed operations and full-speed steady-state operations to determine a more comprehensive analysis and detection of rotor anomalies.

Referring back to FIG. 2, if it is determined at 210, that turbine 105 is operating in a transient speed operation, then on-site monitoring unit 125 continues with its processing of the vibration and operational measurements obtained from vibration sensors 115 and operational sensors 120. In particular, on-site monitoring unit 125 performs a data quality check of the data generated from vibration sensors 115 and operational sensors 120 at 220. The data quality check generally entails determining whether the measurements obtained from vibration sensors 115 and operational sensors 120 are reasonable and healthy (i.e., above or below a certain limit). Based on the data quality check, on-site monitoring unit 125 determines whether the sensors are bad or have failed at 225.

Generally, a sensor will be considered to be bad or have failed if the measurements are not reasonable as determined by the data quality check operation. If on-site monitoring unit 125 determines that any of the sensors are bad or have failed, then any measurements that they have generated are ignored at 230. In one embodiment, any measurements generated from a sensor that was deemed to be bad or failed could be flagged so that remote monitoring unit 130 can be made aware to avoid processing any such data.

Processing of the vibration measurements and the operational measurements continue at 235 where on-site monitoring unit 125 classifies the vibration measurements into one of a plurality of predetermined ranges of turbine rotor speed at 235. At 240, on-site monitoring unit 125 determines the maximum vibration data for each of the ranges of turbine rotor speed. As mentioned above, this operation includes comparing vibration data obtained from vibration sensors 115 at a certain rotor speed to a maximum value that is stored in memory as turbine 105 cycles through the transient speed operation. If an incoming vibration measurement exceeds a maximum value stored in memory, then it replaces that value for that particular rotor speed range of classification. If the incoming vibration measurement does not exceed the maximum value stored in memory, then the existing value remains in memory.

Next, as shown in FIG. 2, a determination is made as to whether the transient speed operation is complete at 245. If turbine 105 is still undergoing the transient speed operation, then the process operations associated with blocks 205-245 are repeated until it is determined that the transient speed operation is complete.

Once the transient speed operation is complete, on-site monitoring unit 125 can then compile the maximum vibration data for each of the predetermined ranges of turbine speed into the snapshot at 250. The snapshot is generally a representation of vibration features or a vibration signature of the vibration that is exhibited by rotor 110 as turbine 105 performs the transient speed operation. In addition, the snapshot may also include the operational data obtained during the transient speed operation by operation sensors 120. As mentioned above, the compiling of the maximum vibration data into the snapshot can include gathering the maximum vibration data and the relevant speed at which it occurs and the operational data obtained during the transient speed operation, and placing this data in a form that comprises time-series data and trigger event-based data. With the vibrational snapshot in a time-series format and a trigger event-based format, on-site monitoring unit 125 can then send this information to a remote site for further processing and analysis.

As shown in FIG. 2, on-site monitoring unit 125 transmits the snapshot in a time-series format to remote monitoring unit 130 at 260 and transmits the snapshot in the trigger-event based format to the remote monitoring unit at 265. FIG. 2 shows that the process flow of operations between block 265 and 290 in the remote site is in a dotted line. This signifies, as mentioned above, that the processing operations performed by remote monitoring unit 130 can include the use of the snapshot in the trigger-event based format in conjunction with the snapshot in the time-series format, or used on its own.

In one embodiment, once remote monitoring unit 130 receives the snapshots, it analyzes the snapshot embodied in the time-series format at 270 to determine the presence of a potential anomaly. This may include determining whether the vibration data as embodied in the snapshot is exhibiting non-repeatable behavior or has exceeded a predetermined threshold. If no potential anomaly is detected as determined at 275, then remote monitoring unit 130 does not take an action as noted at 280.

On the other hand, if a potential anomaly is detected at 275 (i.e., the snapshot if the vibration data is exhibiting non-repeatable behavior or has exceeded a predetermined threshold), then remote monitoring unit 130 can initiate an escalated or heighten review of the snapshot. As shown in FIG. 2, this entails performing a confirmatory turbine rotor anomaly analytic at 285 to determine the actual presence of an anomaly. In one embodiment, the confirmatory turbine rotor anomaly analytic would use the snapshot of the vibration data as embodied in the trigger event-based data format (transmitted at 265) and compare it to historical vibration measurement snapshots obtained from a predetermined number of previous transient speed operations performed by turbine rotor 105.

If it is determined at 290 that the snapshot of the vibration measurements obtained from on-site monitoring unit 125 is exhibiting non-repeatable behavior in comparison to the historical vibration measurement snapshots, then that would be an indication of turbine rotor anomaly. If remote monitoring unit 130 determines the actual presence of an anomaly, then it could generate a recommended corrective action to take to remedy the anomaly at 295. Alternatively, if remote monitoring unit 130 does not detect the presence of an anomaly, then it would not recommend taking any corrective actions as noted at 280.

As mentioned above, an alternative embodiment includes having remote monitoring unit 130 determine the presence of an anomaly using only the snapshot of the vibration measurements embodied in the trigger event-based data format as opposed to using both the snapshot in a time-series format and the trigger event-based data format. In this embodiment, process operations 260-285 would not be performed.

Another alternative embodiment could include having remote monitoring unit 130 determine the presence of an anomaly using only the snapshot of the vibration measurements embodied in the time-series format as opposed to using both the snapshot in a time-series format and/or the trigger event-based data format. In this embodiment, process operations 285-290 would not have to be performed.

The foregoing flow chart shows some of the processing functions associated with detecting the presence of a turbine rotor anomaly. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added. For example, the process operations depicted in FIG. 2 may involve comparing rotor states to one another to detect rotor anomalies. In such a scenario, the transient speed operations obtained from previously run operations could be binned by specific operations (e.g., wheelspace temperatures) and later compared to a specific operation obtained from a turbine to ascertain whether anomalies exist.

In the various embodiments of the present invention, portions of the processing operations performed by on-site monitoring unit 125 and remote monitoring unit 130 can be implemented in the form of an entirely hardware embodiment, an entirely software embodiment or an embodiment containing both hardware and software elements. In one embodiment, the processing functions performed by on-site monitoring unit 125 and remote monitoring unit 130 may be implemented in software, which includes but is not limited to firmware, resident software, microcode, etc.

Furthermore, the processing functions performed by on-site monitoring unit 125 and remote monitoring unit 130 can take the form of a computer program product accessible from a computer-usable or computer-readable medium providing program code for use by or in connection with a computer or any instruction execution system (e.g., processing units). For the purposes of this description, a computer-usable or computer readable medium can be any computer readable storage medium that can contain or store the program for use by or in connection with the computer or instruction execution system.

The computer readable medium can be an electronic, magnetic, optical, electromagnetic, infrared, or semiconductor system (or apparatus or device). Examples of a computer-readable medium include a semiconductor or solid state memory, a random access memory (RAM), a read-only memory (ROM), a rigid magnetic disk and an optical disk. Current examples of optical disks include a compact disk-read only memory (CD-ROM), a compact disk-read/write (CD-R/W) and a digital video disc (DVD).

Those skilled in the art will recognize that it may be possible to implement some of the functionality performed by remote monitoring unit 130 in on-site monitoring unit 125, such that the on-site monitoring unit is able to process the vibration and operational measurements into a snapshot and eventually determine the presence of turbine rotor anomalies. Likewise, it may be possible to implement some of the functionality performed by on-site monitoring unit 125 in remote monitoring unit 130, such that the remote monitoring unit is able to perform operations that include collecting vibration measurements and operational measurements, processing the measurements to generate a snapshot, and analyzing the snapshot to determine the presence of turbine rotor anomalies.

Although the description heretofore has been directed to determining anomalies from one turbine, those skilled in the art will recognize that the various embodiments of the present invention are suitable for monitoring the operation with multiple turbines at one particular site, and even is suitable for monitoring the operation of turbines located in multiple locations. For example, in a site where there was more than one turbine 105, on-site monitoring unit 125 would be coupled to each of these turbines and would receive the various measurements (vibration measurements, speed measurements, etc.). In such a scenario, on-site monitoring unit 125 would continually execute the algorithm that performs the operations that include classifying the vibration measurements into one of a plurality of predetermined ranges of turbine rotor speed, determining maximum vibration data for each of the plurality of predetermined ranges of turbine rotor speed, and at the completion of the transient speed operation, compiling the maximum vibration data into a snapshot of the vibration measurements obtained during the operation. On-site monitoring unit 125 would then transmit the snapshot from the various turbines located at the site to remote monitoring unit 130 via communications network 135 for analysis to determine the presence of a potential anomaly.

Those skilled in the art will recognize that the various embodiments of the present invention can be modified to combine the turbine rotor anomaly detection methodology used for transient speed operations in combination with anomalies detected from full-speed operation data to attain a more comprehensive detection of rotor anomalies that may exist.

In another embodiment, it would be conceivable to obtain an even more comprehensive detection of rotor anomalies by combining the transient speed operation anomaly detection processes described herein with full speed operation anomaly detection processes and with frequency information derived the vibration measurements (e.g., using a Fourier Transform to determine certain vibration amplitudes and frequencies associated with the measurements). In this embodiment, one would have to retrofit the turbines with the necessary equipment to obtain the frequency data associated with the vibration measurements, and change the algorithms at the on-site monitoring unit and the remote monitoring unit to accommodate such operations.

While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the disclosure.

What is claimed is:

1. A system, comprising:
at least one vibration sensor that obtains vibration measurements from a rotor during a transient speed operation;
an on-site monitoring unit, local to the at least one vibration sensor and the rotor, that monitors the vibration measurements during the transient speed operation, the on-site monitoring unit classifying the vibration measurements into one of a plurality of predetermined ranges of rotor speed during the transient speed operation, determining maximum vibration data for each of the plurality of predetermined ranges of rotor speed during the transient speed operation, and compiling the maximum vibration data into a snapshot of the vibration measurements obtained during the transient speed operation after the rotor completes the transient speed operation; and
a remote monitoring unit, remote from the at least one vibration sensor, the rotor and the on-site monitoring unit, that detects a rotor anomaly from the snapshot of vibration measurements generated by the on-site monitoring unit.

2. The system according to claim 1, wherein the on-site monitoring unit performs data quality checks on the vibration measurements to determine if the at least one vibration sensor is operating properly.

3. The system according to claim 1, wherein the on-site monitoring unit transmits the snapshot of the vibration measurements to the remote monitoring unit in a form that comprises one of time-series data and trigger event-based data.

4. The system according to claim 3, wherein the remote monitoring unit comprises a transactional database to store the trigger event-based data.

5. The system according to claim 1, wherein the remote monitoring unit analyzes the snapshot of the vibration measurements to determine if the vibration measurements obtained during the transient speed operation is indicative of a potential rotor anomaly.

6. The system according to claim 5, wherein the remote monitoring unit analyzes the snapshot of the vibration measurements to determine if the vibration measurements obtained during the transient speed operation is exhibiting non-repeatable behavior from a base level, the remote monitoring unit generating an escalation alarm indicating the presence of a potential rotor anomaly in response to determining that the vibration measurements are exhibiting non-repeatable behavior.

7. The system according to claim 5, wherein the remote monitoring unit analyzes the snapshot of the vibration measurements to determine if the vibration measurements obtained during the transient speed operation exceeds a predetermined threshold, the remote monitoring unit generating an escalation alarm indicating the presence of a potential rotor anomaly in response to determining that the vibration measurements exceeded the predetermined threshold.

8. The system according to claim 5, wherein the remote monitoring unit performs a confirmatory rotor anomaly analytic in response to determining the presence of a potential rotor anomaly.

9. The system according to claim 8, wherein the confirmatory rotor anomaly analytic comprises comparing the snapshot of the vibration measurements obtained during the transient speed operation to historical vibration measurement snapshots obtained from a predetermined number of previous transient speed operations performed by the rotor.

10. The system according to claim 9, wherein the confirmatory rotor anomaly analytic determines the detection of a rotor anomaly in response to determining that the snapshot of the vibration measurements is exhibiting non-repeatable behavior in comparison to the historical vibration measurement snapshots obtained from the predetermined number of previous transient speed operations.

11. The system according to claim 10, wherein the remote monitoring unit recommends a corrective action in response to determining the detection of a rotor anomaly.

12. The system according to claim 5, wherein the remote monitoring unit compares the snapshot of the vibration measurements obtained during the transient speed operation to historical vibration measurement snapshots obtained from a predetermined number of previous transient speed operations performed by the rotor.

13. The system according to claim 12, wherein the remote monitoring unit determines the detection of a rotor anomaly in response to determining that the snapshot of the vibration measurements is exhibiting non-repeatable behavior in comparison to the historical vibration measurement snapshots obtained from the predetermined number of previous transient speed operations.

14. The system according to claim 13, wherein the remote monitoring unit recommends a corrective action in response to determining the detection of a rotor anomaly.

15. A system for detecting rotor anomalies in real-time, comprising:
  a rotor;
  one or more operational sensors located about the rotor to measure operational data during a transient speed operation of the rotor, the operational data including rotor speed;
  at least one vibration sensor that obtains vibration measurements from the rotor during the transient speed operation; and
  a monitoring unit that detects a rotor anomaly based on the vibration measurements and the operational data obtained during the transient speed operation, wherein the monitoring unit classifies the vibration measurements into one of a plurality of predetermined ranges of rotor speed during the transient speed operation, determines maximum vibration data for each of the plurality of predetermined ranges of rotor speed during the transient speed operation, compiles the maximum vibration data into a snapshot of the vibration measurements obtained during the transient speed operation after the rotor completes the transient speed operation, and analyzes the snapshot of the vibration measurements to determine if the vibration measurements obtained during the transient speed operation is indicative of a potential a rotor anomaly.

16. The system according to claim 15, wherein the monitoring unit analyzes the snapshot of the vibration measurements to determine if the vibration measurements obtained during the transient speed operation is exhibiting non-repeatable behavior from a base level, the monitoring unit generating an escalation alarm indicating the presence of a potential rotor anomaly in response to determining that the vibration measurements are exhibiting non-repeatable behavior.

17. The system according to claim 15, wherein the monitoring unit analyzes the snapshot of the vibration measurements to determine if the vibration measurements obtained during the transient speed operation exceeds a predetermined threshold, the monitoring unit generating an escalation alarm indicating the presence of a potential rotor anomaly in response to determining that the vibration measurements exceeded the predetermined threshold.

18. The system according to claim 15, wherein the monitoring unit performs a confirmatory rotor anomaly analytic in response to determining detection of the potential rotor anomaly, the confirmatory rotor anomaly analytic comprises comparing the snapshot of the vibration measurements obtained during the transient speed operation to historical vibration measurement snapshots obtained from a predetermined number of previous transient speed operations performed by the rotor, the confirmatory rotor anomaly analytic indicating detection of a rotor anomaly in response to determining that the snapshot of the vibration measurements is exhibiting non-repeatable behavior in comparison to the historical vibration measurement snapshots obtained from the predetermined number of previous transient speed operations.

19. The system according to claim 15, wherein the monitoring unit compares the snapshot of the vibration measurements obtained during the transient speed operation to historical vibration measurement snapshots obtained from a predetermined number of previous transient speed operations performed by the rotor, the monitoring unit indicating detection of a rotor anomaly in response to determining that the snapshot of the vibration measurements is exhibiting non-repeatable behavior in comparison to the historical vibration measurement snapshots obtained from the predetermined number of previous transient speed operations.

20. A computer-readable storage device storing computer instructions, which when executed, enables a computer system to perform a method for detecting rotor anomalies, the method comprising:
  receiving vibration data obtained from a rotor during a transient speed operation;
  classifying the vibration data into one of a plurality of predetermined ranges of rotor speed during the transient speed operation;
  determining maximum vibration data for each of the plurality of predetermined ranges of rotor speed during the transient speed operation;
  in response to the rotor completing the transient speed operation, compiling the maximum vibration data into a snapshot of the vibration data obtained during the transient speed operation; and
  analyzing the snapshot of the vibration data to determine if the vibration measurements obtained during the transient speed operation is indicative of a rotor anomaly, the analyzing comprises performing one of ascertaining whether the snapshot of the vibration data is indicative of a potential detection of a rotor anomaly and comparing the snapshot of the vibration data obtained during the transient speed operation to historical vibration measurement snapshots obtained from a predetermined number of previous transient speed operations performed by the rotor in response to determining the potential detection of a rotor anomaly, and comparing the snapshot of the vibration data obtained during the transient speed operation to historical vibration measurement snapshots obtained from a predetermined number of previous transient speed operations performed by the rotor and determining whether the snapshot of the vibration measurements is exhibiting non-repeatable behavior in comparison to the historical vibration measurement snapshots obtained from the predetermined number of previous transient speed operations.

* * * * *